(12) United States Patent
Wada et al.

(10) Patent No.: US 7,178,761 B2
(45) Date of Patent: Feb. 20, 2007

(54) CONTAINER APPARATUS FOR OBJECT TO BE DROPPED

(75) Inventors: Shigeru Wada, Kanagawa (JP); Saburo Ohashi, Kanagawa (JP); Shigeki Akamatsu, Kanagawa (JP)

(73) Assignee: Japan Aircraft Manufacturing Co., Ltd., Kanagawa (JP)

( * ) Notice: Subject to any disclaimer, the term of this patent is extended or adjusted under 35 U.S.C. 154(b) by 541 days.

(21) Appl. No.: 10/408,272

(22) Filed: Apr. 7, 2003

(65) Prior Publication Data

US 2006/0289699 A1    Dec. 28, 2006

(51) Int. Cl.
*B64D 17/64* (2006.01)

(52) U.S. Cl. ............... 244/138 R; 244/147; 244/149
(58) Field of Classification Search ............. 244/13 A, 244/138 R, 138 A, 147–152
See application file for complete search history.

(56) References Cited

U.S. PATENT DOCUMENTS

| 1,323,983 | A | * | 12/1919 | Irvin | ............ 244/149 |
| 2,326,813 | A | * | 8/1943 | Wilson | ............ 244/149 |
| 2,577,737 | A | * | 12/1951 | Brown | ............ 244/148 |
| 3,623,681 | A | * | 11/1971 | Ashline | ............ 244/138 R |
| 3,894,648 | A | * | 7/1975 | Croullebois | ............ 244/138 R |
| 4,487,102 | A | * | 12/1984 | Fritz | ............ 244/149 |

* cited by examiner

*Primary Examiner*—Galen Barefoot
(74) *Attorney, Agent, or Firm*—Lawrence E. Laubscher, Jr.

(57) ABSTRACT

A container apparatus for an object to be dropped, which contains an object to be dropped functioning as a point marker or a hydrographic conditions measuring device or the like and is dropped by a transport airplane such as an aircraft flying in the air to a water surface of sea, lake or the like, or to land or the like. The container apparatus follows a substantially uniform trajectory after being dropped by the transport airplane, and after being dropped, reduces the flight speed thereof to a fixed speed, to release the object to be dropped housed therein.

2 Claims, 4 Drawing Sheets

CONTAINER APPARATUS FOR OBJECT TO BE DROPPED

FIELD OF THE INVENTION

The present invention relates to a container apparatus for an object to be dropped, which contains an object to be dropped (hereunder referred to as a drop object) functioning as a point marker or a hydrographic conditions measuring device or the like and is dropped by a transport airplane such as an aircraft flying in the air to a water surface of sea, lake or the like, or to land or the like.

DESCRIPTION OF THE RELATED ART

Conventionally, in order to drop an object from a transport airplane such as an aircraft, to a water surface of sea, lake or the like, or to land or the like, the object is simply thrown out, as it is, into the air to be dropped. However, an object thrown out by an aircraft flying at a high speed is subjected to a large aerodynamic load immediately after being thrown down. Accordingly, it is necessary for the drop object to be of high strength. Furthermore, sometimes a trajectory of the drop object after threw out by the aircraft becomes unstable under an influence of an air current near the transport airplane, and an influence of the aerodynamic interference between the drop object and the transport airplane. Accordingly, when the trajectory of the drop object is disturbed, there is a danger of the thrown drop object contacting the transport airplane, and in order to prevent this from occurring, it is necessary to invest a great deal of effort to test and guarantee that such contact does not occur.

In order to deal with this problem, conventionally, the drop object is housed in a container of a suitable shape, the container housing the drop object therein is loaded onto an aircraft to be transferred to a position over a target point, and is then dropped into the air. Immediately after being dropped by the aircraft, the container opens to release the drop object housed therein into the air. Alternatively, the container opens after having reached a certain altitude determined by an altimeter (barometer) installed in the container, to release the drop object housed therein into the air.

However, in this conventional method of dropping an object using a container, since immediately after being dropped by the aircraft, the container opens to release the drop object housed therein into the air, the drop object is subjected to a large aerodynamic load immediately after being released, in substantially the same manner as when the drop object is simply released, as it is, into the air. Consequently, there may the case where the drop object is broken, or is unable to perform a desired function. Therefore, the drop object must be of high strength. Alternatively, in the case where the container opens after having reached a certain altitude determined by an altimeter (barometer) installed in the container, to release the drop object housed therein into the air, the drop object may be released into the air before a falling speed of the container is decreased to a fixed speed to be subjected to a large aerodynamic load in the same manner as above. Accordingly, in the same manner as described above, the drop object must be of high strength.

SUMMARY OF THE INVENTION

The present invention has been accomplished in view of the above problems, and has an object of providing a container apparatus for an object to be dropped, which, after being dropped by a transport airplane, follows a substantially uniform trajectory and decreases a falling speed thereof to a fixed speed, to release the drop object housed therein.

In order to achieve the object described above, a container apparatus for an object to be dropped according to the present invention comprises: a cylindrical container main body which is just divided vertically into two portions, with one ends of the two portions at one end section thereof being connected with each other by a hinge and the other ends of the two portions at the opposite end section thereof capable of being decoupled from each other to both sides, for housing therein an object to be dropped which exhibits a predetermined function, to be dropped by a transport airplane; main body coupling means for coupling the other ends at the opposite end section of the container main body so as to prevent them from being decoupled from each other; main body releasing means for releasing the coupling by the main body coupling means, to decouple the other ends from each other; and an automatic extending cable which extends from the one end section of the container main body and is attached to the transport airplane to activate the main body releasing means.

According to such a construction, the drop object which exhibits the predetermined function is housed in the cylindrical container main body which is just divided vertically into two portions, with the one ends of the two portions connected by the hinge and the opposite ends of the two portions capable of being decoupled from each other to both sides, the container housing the drop object therein is dropped by the transport airplane, and then, the main body releasing means are activated by the automatic extending cable which extends from the one end section of the container main body to be attached to the transport airplane, thereby releasing the coupling by the main body coupling means which couples the other ends at the opposite end section of the container main body to prevent the other ends from being decoupled from each other, to decouple the other ends at the opposite end section of the container main body. As a result, since the drop object is not released directly by the transport airplane, it is possible to prevent the drop object from being subjected to a large aerodynamic load immediately after being dropped. Accordingly, it is not necessary for the drop object to be excessively strong. Furthermore, the container main body housing the drop object therein is able to follow a substantially uniform trajectory after being dropped.

DETAILED DESCRIPTION OF PREFERRED EMBODIMENTS

Figure 1:
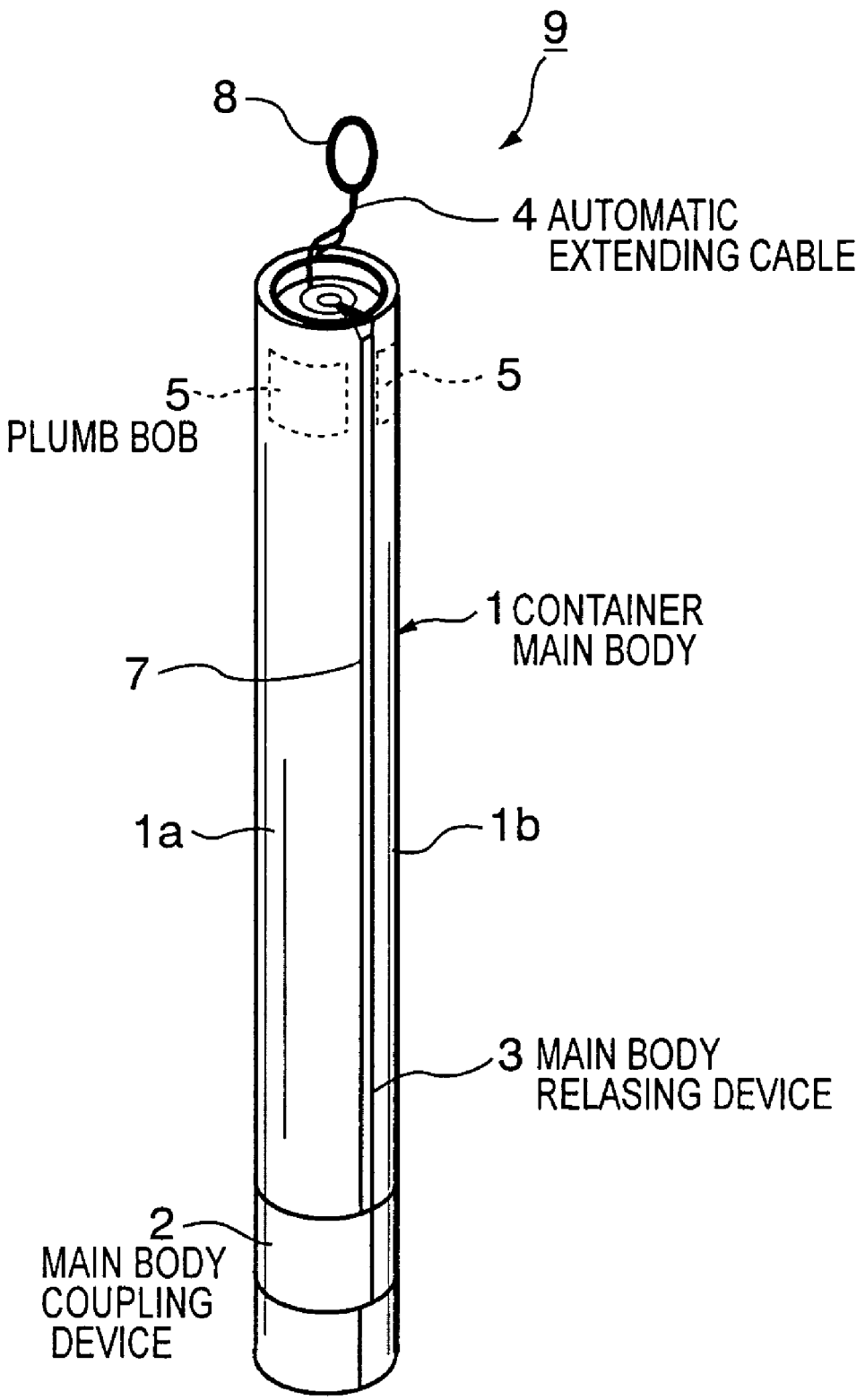
FIG. 1 is a perspective view showing an embodiment of a container apparatus for an object to be dropped according to the present invention.

FIG. 1 is a perspective view showing an embodiment of a container apparatus for an object to be dropped (hereunder referred to as a drop object) according to the present invention. This container apparatus houses therein a drop object which functions as a point marker or a hydrographic conditions measuring device or the like, to be dropped by a transport airplane such as an aircraft flying in the air to a water surface of sea, lake or the like, or to land or the like. The container apparatus comprises a container main body 1, main body coupling means 2, main body releasing means 3, an automatic extending cable 4, and a plumb bob 5.

Figure 3:
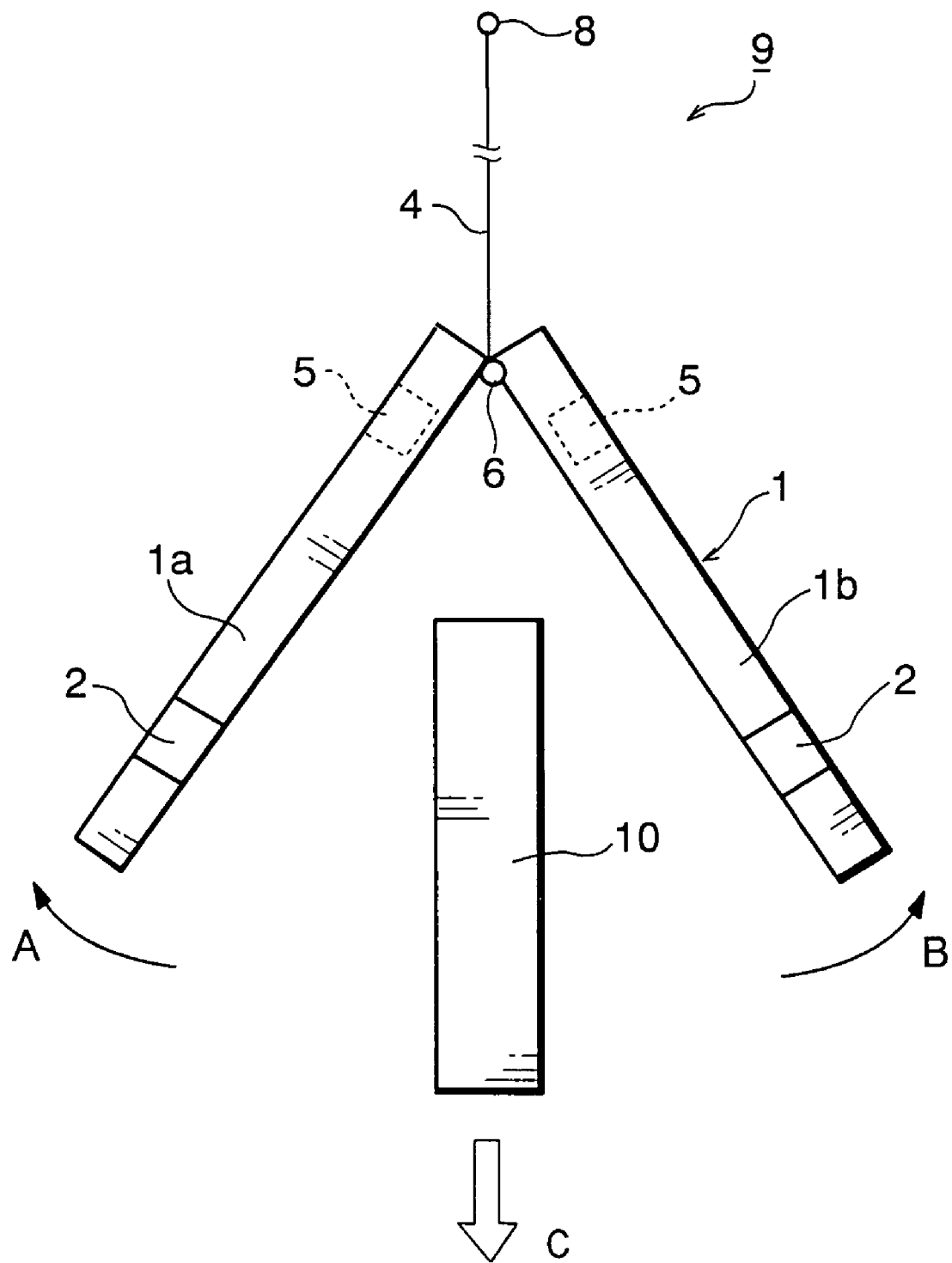
FIG. 3 is an explanatory diagram showing a state where the container apparatus for an object to be dropped is used.

In FIG. 1, the container main body 1 houses therein a drop object which exhibits a predetermined function, to be dropped by the transport airplane (not shown in the figures), and is formed from thick paper, plastic or metal or the like in the shape of a cylinder with a circular or polygonal cross-section. The container main body 1 is just divided vertically into two portions (1a and 1b), and as shown in FIG. 3, one ends (upper ends) of the two portions at one end section of the container main body 1 are connected by a hinge 6 and the other ends (lower ends) at the opposite end section of the container main body 1 are able to be decoupled from each other to both sides, as indicated by the arrows A and B. Specifically, as shown in FIG. 1, the shape of the container main body 1 is a circular cylinder with an outer diameter of approximately 120 mm and a total length of approximately 1000 mm, for example, and one of division lines 7 between the vertically divided main body members 1a and 1b is shown on the side wall of the container main body 1.

The main body coupling means 2 is provided at the opposite end section near the bottom of the container main body 1. This main body coupling means 2 couples the other ends of the two portions of the container main body 1 to prevent the other ends from being decoupled, and as an example, consists of a tape member wound around the outer peripheral surface of the opposite end section of the container main body 1. Specifically, an adhesive tape with a width of approximately 100 mm and a length of approximately 220 mm is wound around the outer peripheral surface of the opposite end section of the container main body 1. Accordingly, it is possible with a simple material to couple the other ends at the opposite end section of the container main body 1 to prevent the other ends from being decoupled. This main body coupling means 2 consisting of the tape member can be cut with a cord type member as described below.

The main body releasing means 3 are attached to opposite side wall portions of the container main body 1. The main body releasing means 3 release the coupling of the main body coupling means 2, thereby decoupling the other ends at the opposite end section of the container main body 1, and as an example, consists of a cord type member which is connected to the automatic extending cable 4 described below to cut the tape member serving as the main body coupling means 2 by the extension of the automatic extending cable 4. Specifically, a type of line known as "silken gut", which is a strong line used in fishing, can be used for the cord type member serving as the main body releasing means 3. This cord type member (3) is not limited to the silken gut mentioned above, and a line made of synthetic fibers or metal or the like may also be used. By using such members, it is possible with a simple construction to release the coupling by the main body coupling means 2, thereby decoupling the other ends at the opposite end section of the container main body 1.

Figure 2:
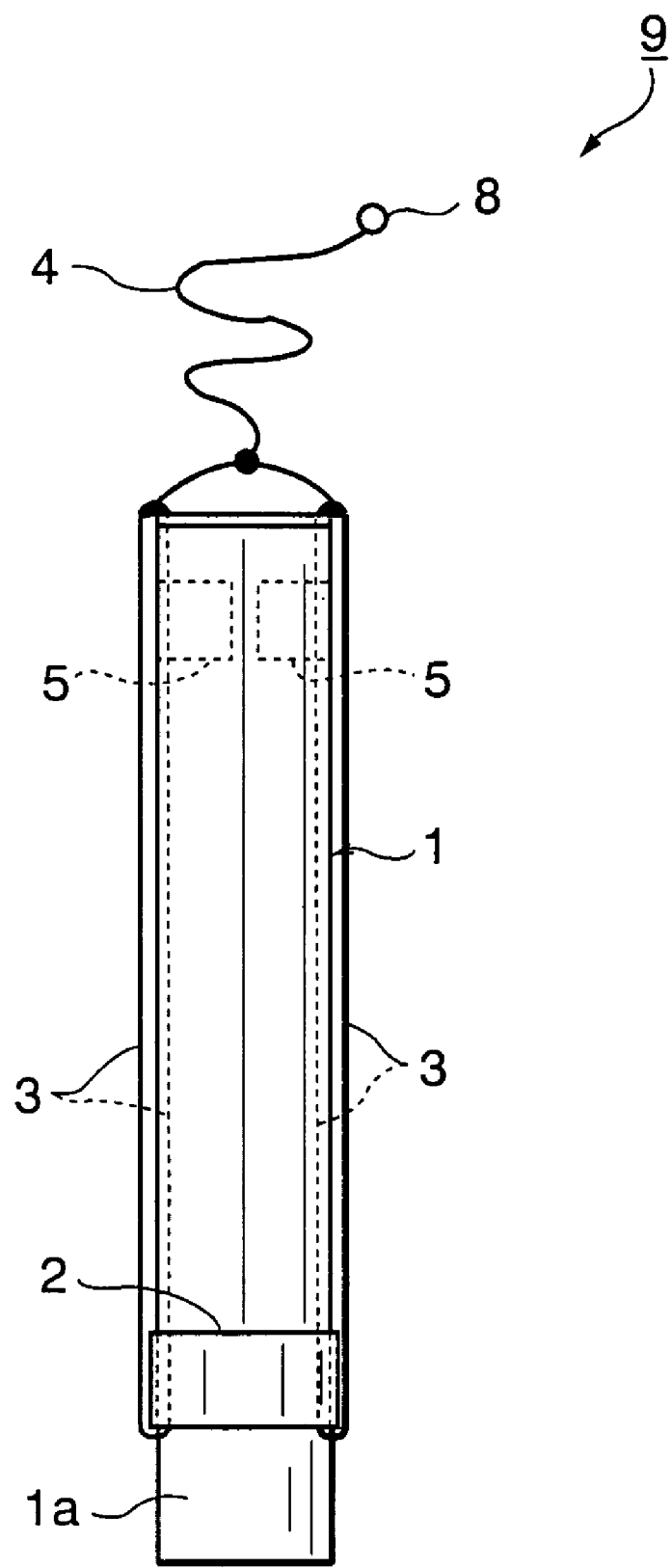
FIG. 2 is a front view showing the embodiment of the container apparatus for an object to be dropped.

Then, as shown in FIG. 1 and FIG. 2, the cord type member (3) is arranged in an elongated loop shape in a manner to loop around the inside and outside of the container main body 1, along each of the division lines 7 on the opposite side wall portions of the container main body 1, and also to loop around the lower edge of the tape member (2) at a lower end portion thereof, and to be connected to the automatic extending cable 4 described below at an upper end portion thereof. Accordingly, the cord type member (3) is pulled upward due to the extension of the automatic extending cable 4 to cut through the tape member (2). At this time, it becomes possible to facilitate the cutting if a tape easy to be cut is used as the tape member (2), and incision is made at the lower edge of the tape member (2), to loop around the incision with the lower end portion of the looped cord type member (3).

The automatic extending cable 4 is connected to the one end section (upper end section) of the container main body 1. This automatic extending cable 4 is for operating the main body releasing means 3, and extends from the upper end section of the container main body 1 to be attached to the transport airplane (not shown in the figures). The automatic extending cable 4 consists of, for example, a flexible rope member. A ring 8 to be hooked onto a part of the aircraft or the like serving as the transport airplane is attached to an end portion of the rope member. Accordingly, if the entire container apparatus is dropped into the air while this ring 8 is hooked onto the part of the aircraft or the like, then the automatic extending cable 4 will extend automatically, thereby operating the main body releasing means 3.

A plumb bob 5 is incorporated in the inside of the container main body 1. This plumb bob 5 is for adjusting a trajectory followed by the entire container apparatus 9 housing therein the drop object, constructed as described above, after being dropped by the transport airplane. One or a plurality of weights is provided at predetermined locations inside the container main body 1, according to need, for example at the upper end section, or in the middle of the main body 1. As a result, it becomes possible to adjust the weight, center of gravity, and moment of inertia of the entire container main body 1 housing therein the drop object to conform the dropping property of the transport airplane. In the case where the plumb bob 5 is unnecessary, depending on the weight or center of gravity or the like of the entire container main body 1 housing therein the drop object, the plumb bob 5 needs not be provided.

Next, the use and operation of the container apparatus 9 constructed in this manner are described with reference to FIG. 1 to FIG. 3. First, in FIG. 1 and FIG. 2, the lower ends of the main body members 1a and 1b which are formed by just dividing the container main body 1 vertically into two are placed in a state in which they can be opened, these lower ends of the main body members 1a and 1b are opened outwards to the left and right, and the drop object which exhibits the function as the point marker or the hydrographic conditions measuring device or the like, is housed in the container main body 1.

Subsequently, the lower ends of the main body members 1a and 1b are closed, and as shown in FIG. 1 and FIG. 2, the tape member serving as the main body coupling means 2 is wound around the outer peripheral surface of the opposite end section, thereby coupling the lower ends of the main body members 1a and 1b of the container main body 1 and preventing it from being opened. At this time, as shown in FIG. 2, the cord type member serving as the main body releasing means 3 is arranged in a loop shape in a matter to loop around the outside and the inside of the tape member (2) in a loop, and is connected to the automatic extending cable 4 at the upper end portion thereof. The drop object is thereby housed in the container main body 1.

Next, the container apparatus 9 housing therein the drop object as described above, is loaded onto the aircraft serving as the transport airplane. The aircraft carrying the container apparatus 9 housing the drop object then flies to a position above a predetermined land area or sea area, and upon reaching a point of salvage or search practice, for example, an operator on the aircraft hooks the ring 8 of the automatic extending cable 4 onto a part of the aircraft, opens a door or hatch and drops the entire container apparatus 9 into the air. The container apparatus 9 housing therein the drop object then falls freely, and follows a substantially uniform trajectory after being dropped by the transport airplane, due to the cylindrical container shape and the plumb bobs 5 and the like.

In this state, the automatic extending cable 4, the ring 8 of which is hooked onto the part of the aircraft, extends automatically to a predetermined length, and upon reaching the full length, the automatic extending cable 4 pulls the cord type member (3), thereby cutting the tape member 2 with the cord type member (3). Consequently, the coupling at the opposite end section of the container main body 1 is released, and as shown in FIG. 3, an air pressure during the falling causes the main body members 1a and 1b to rotate about the hinge 6 to be opened, as indicated by the arrows A and B. As a result, a drop object 10 housed in the container main body 1 is released, and then falls as indicated by the arrow C.

Subsequently, the drop object 10 falls freely, or falls using a parachute or the like, and lands on the land or water surface of the predetermined land area or sea area, to exhibit the function as the point marker or the hydrographic conditions measuring device, or the like.

Figure 4:
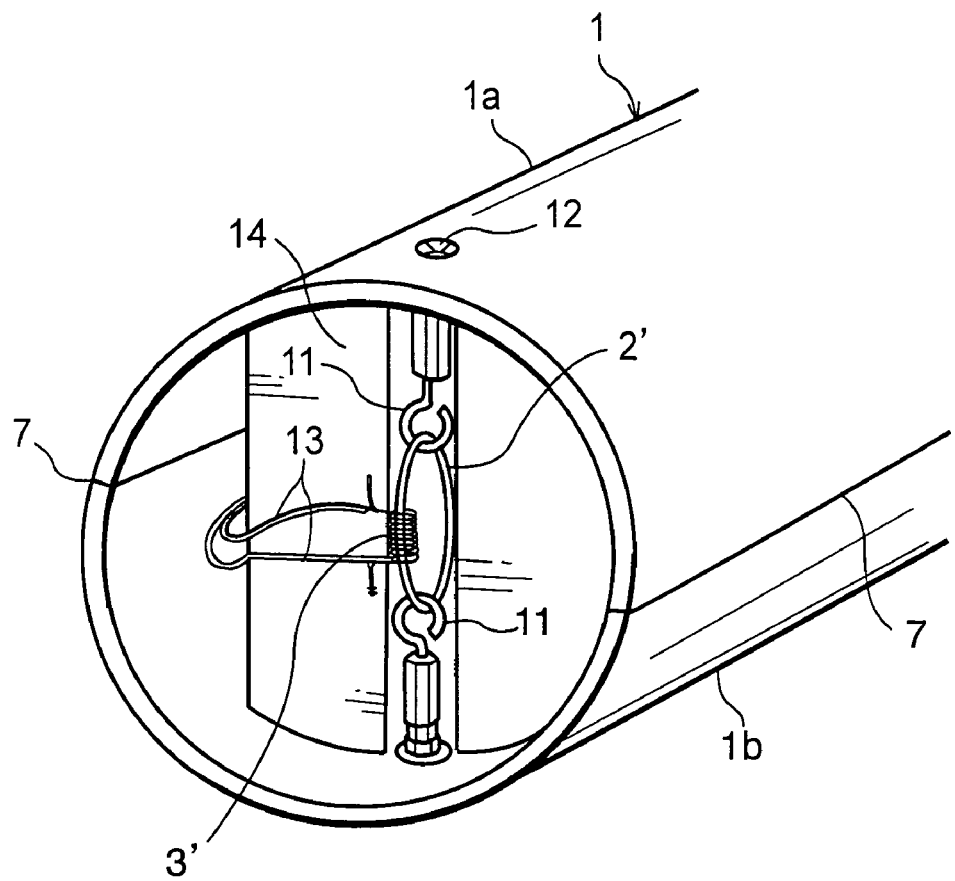
FIG. 4 is an explanatory diagram showing another embodiment of main body coupling means and main body releasing means of the container apparatus for an object to be dropped.

FIG. 4 is an explanatory diagram showing another embodiment of the main body coupling means 2 and the main body releasing means 3. FIG. 4 shows a configuration of the bottom face of the container main body 1 shown in FIG. 1, and in this embodiment, as a main body coupling means 2', there is used a thread type member which draws together and ties the main body members 1a and 1b which are formed by just dividing the container vertically into two, and which is melted to be broken at a predetermined heating temperature, and as a main body releasing means 3', there is used a heating member which is activated by the extension of the automatic extending cable 4, and melts to brake the main body coupling means 2'.

A strong line used in fishing known as "silk gut" can be used for the thread type member serving as the main body coupling means 2'. Furthermore, opposing hooks 11 which face inward are mounted at the lower ends of the main body members 1a and 1b of the container main body 1, and the thread type member (2') is wound between these hooks 11 a plurality of times, and tightened so as to draw the main body members 1a and 1b together. Moreover, it is possible to adjust a distance between the hooks 11 by turning screws 12 used to mount the hooks 11, by a screwdriver, thereby adjusting the tightness of this thread type member (2'). Furthermore, provided that the thread type member (2') is melted to be broken at the predetermined heating temperature, the thread type member (2') is not limited to the silk gut mentioned above, and a line made of a synthetic fiber or a metal or the like may also be used. Accordingly, it is possible with a simple material to couple the other ends at the opposite end section of the container main body 1 so as to prevent them from being decoupled.

A nichrome wire having a suitable resistance can be used as the heating member serving as the main body releasing means 3', for example. Then, the heating member (3') is wound onto a part of the thread type member (2') wound between the hooks 11, as shown in FIG. 4, and power is supplied to this heating member (3') from a battery (not shown in the figure) via a lead wire 13. In FIG. 4, reference numeral 14 denotes a hook cover provided in the vicinity of the hooks 11, which also serves as a bottom plate of the container main body 1.

Figure 5:
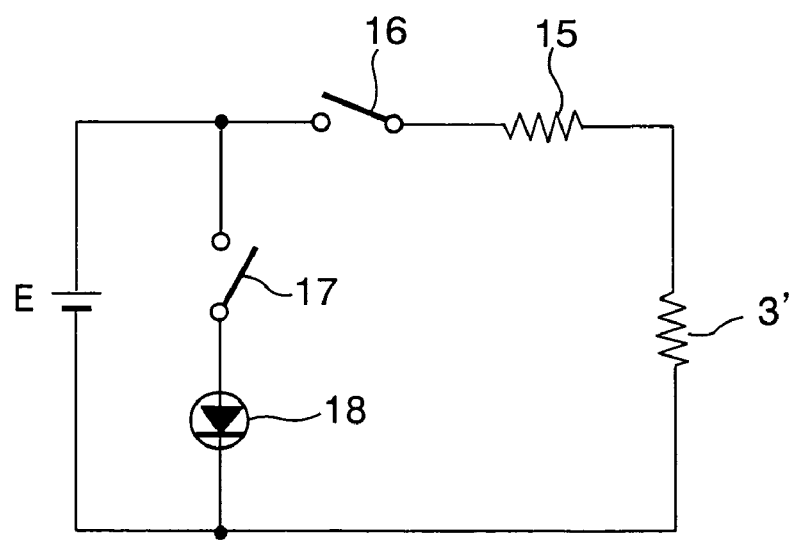
FIG. 5 is a circuit diagram showing a heating control circuit for heating a heating member used as the main body releasing means shown in FIG. 4.

FIG. 5 is a circuit diagram showing a heating control circuit for heating the heating member serving as the main body releasing means 3'. This heating control circuit comprises a battery E, a heating member (3') formed from nichrome wire, a time controller 15, a main switch 16, a test switch 17 for battery testing, and a battery test lamp (such as a light emitting diode) 18.

The time controller 15 controls a period of time until the thread type member (2') serving as the main body coupling means is heated and melted to be broken by the heating member (3'), and comprises a resistor which gives a predetermined delay time, and which may be a variable resistor. Furthermore, the main switch 16 switches the ON/OFF of the power supply to the heating member (3') from the battery E, and a switching member thereof is activated by the extension of the automatic extending cable 4 shown in FIG. 1 and FIG. 2, to turn the main switch 16 ON/OFF. In other words, the main switch 16 is normally OFF, but turns ON by the extension of the automatic extending cable 4 attached to the transport airplane.

Next is a description of the operations of the main body coupling means 2' and the main body releasing means 3' shown in FIG. 4 and FIG. 5. First, the drop object 10, which exhibits the function as the point marker or the hydrographic conditions measuring device or the like, is housed in the container main body 1 in exactly the same manner as in the embodiment described above. Then, in the state where the lower ends of the main body members 1a and 1b are closed, the thread type member (2') is wound a plurality of times between the opposing hooks 11 and tightened so as to draw the main body members 1a and 1b together, thereby coupling the lower ends of the main body members 1a and 1b at the opposite end section of the container main body 1 so as to prevent the opposite end section of the container main body 1 from being opened.

Next, the heating member (3') is wound onto a part of the thread type member (2') wound between the hooks 11, and the battery E shown in FIG. 5 is connected to this heating member (3') via a lead wire 13. At this time, an actuating portion for the switching member of the main switch 16 shown in FIG. 5 is connected to the automatic extending cable 4 shown in FIG. 1 and FIG. 2. The drop object 10 is thereby housed in the container main body 1.

Next, the container apparatus 9 housing therein the drop object 10 is loaded onto an aircraft serving as the transport airplane. Then, in the same manner as above, the aircraft carrying the container apparatus 9 housing therein the drop object flies to a position above a predetermined land area or sea area, an operator on the aircraft hooks the ring 8 of the automatic extending cable 4 onto a part of the aircraft, opens a door or hatch, and drops the entire container apparatus 9 into the air.

In this state, the automatic extending cable 4, the ring 8 of which is hooked onto the part of the aircraft, extends automatically to a predetermined length, and upon reaching the full length, activates the switching member of the main switch 16, turning the main switch 16 ON. As a result, the power from the battery E is sent to the heating member (3'), and after a delay time determined by the time controller 15, the heating member (3') is heated up to a predetermined heating temperature.

Consequently, the temperature of this heating member (3') melts the thread type member (2') to be broken. As a result, the coupling at the opposite end section of the container main body 1 is released, and as shown in FIG. 3, the air pressure during the falling causes the main body members 1a and 1b to rotate about the hinge 6 to be opened, as indicated by the arrows A and B. As a result, the drop object 10 housed in the container main body 1 is released, and then falls as indicated by the arrow C. Subsequently, the drop object 10 falls freely, or falls using a parachute or the like, and lands on the land or water surface of the predetermined land area or sea area, to exhibit the function as the point marker or the hydrographic conditions measuring device, or the like.

In this manner, since the heating member (3') which melts to break the thread type member (2') when activated by the extension of the automatic extending cable 4 is used as the main body releasing means, it is possible to reduce the flight speed of the container main body 1 to a fixed speed within a fixed time before the thread type member (2') is melted to be broken, causing the lower ends at the opposite end section of the container main body 1 to be decoupled, thereby releasing the drop object 10 housed in the container main body 1. Accordingly, it is possible to prevent the drop object 10 from being subjected to a large aerodynamic load, and it is not necessary for the drop object 10 to be excessively strong.

Furthermore, since the main body releasing means 3 is provided with the time controller 15 which controls the period of time until the thread type member (2') is heated and melted to be broken by the heating member (3'), it is possible to control a period of time until the container reduces the flight speed thereof to the fixed speed to release the drop object 10 housed therein after being dropped. Accordingly, it is possible to control the object release time according to the configuration and function and the like of the drop object 10, to prevent the drop object 10 from being subjected to a large aerodynamic load.

In the embodiment shown in FIG. 4, a tape member serving as the main body coupling means 2 may also be wound around the opposite end section of the container main body 1 in the same manner as shown in FIG. 1 and FIG. 2. In such a case, when the container apparatus 9 housing therein the drop object is dropped by an aircraft into the air and the automatic extending cable 4 is extended automatically to a predetermined length and upon reaching the full length, the tape member (2) is cut, and also the switching member of the main switch 16 is activated, turning the main switch 16 ON. After a predetermined delay time, the thread type member (2') is melted to be broken, the coupling between the lower ends at the opposite end section of the container main body 1 is released, the lower ends are opened as indicated by the arrows A and B, and the drop object 10 housed in the container apparatus 9 is released.

What is claimed is:

1. A container apparatus for an object to be dropped, comprising
    (a) a cylindrical container main body which is divided vertically into two portions, with first ends of said two portions at a first end section thereof being connected with each other by a hinge and second ends of said two portions at an opposite end section thereof capable of being decoupled from each other at both sides, said main body housing therein an object which exhibits a predetermined function to be dropped by a transport airplane;
    (b) main body coupling means for coupling said second ends together, said coupling means comprising a thread-type member which draws said second ends toward each other for tying said second ends together, said thread-type member being severed by melting at a predetermined temperature;
    (c) an automatic extending cable which extends from said first end section of said container main body and is attached to the transport airplane; and
    (d) main body releasing means for releasing said main body coupling means to decouple said second ends from each other to release the object, said releasing means including
        (1) a heating member activated by extension of said automatic extending cable and heating said thread-type member to melt and sever said member; and
        (2) a controller for controlling a heating time of said heating member so that said heating member heats said thread-type member to at least the predetermined temperature, thereby permitting said thread-type member to be severed to decouple said main body.

2. A container apparatus for an object to be dropped as defined in claim 1,
    wherein at least one plumb bob is incorporated at a predetermined location in said container main body, for adjusting a trajectory of said container apparatus after being dropped by the transport airplane.

* * * * *